United States Patent
Maestas

(10) Patent No.: US 11,055,531 B1
(45) Date of Patent: Jul. 6, 2021

(54) AUGMENTED REALITY METHOD FOR REPAIRING DAMAGE OR REPLACING PHYSICAL OBJECTS

(71) Applicant: UIPCO, LLC, San Antonio, TX (US)

(72) Inventor: Jerry John Maestas, San Antonio, TX (US)

(73) Assignee: United Services Automobiie Association (USAA), San Antonio, TX (US)

( * ) Notice: Subject to any disclaimer, the term of this patent is extended or adjusted under 35 U.S.C. 154(b) by 0 days.

(21) Appl. No.: 16/295,112

(22) Filed: Mar. 7, 2019

Related U.S. Application Data

(60) Provisional application No. 62/722,215, filed on Aug. 24, 2018.

(51) Int. Cl.
| | |
|---|---|
| *G06K 9/00* | (2006.01) |
| *G06K 9/62* | (2006.01) |
| *G06Q 30/02* | (2012.01) |
| *G06Q 30/06* | (2012.01) |
| *G06T 7/00* | (2017.01) |
| *H04N 5/77* | (2006.01) |

(52) U.S. Cl.
CPC ..... *G06K 9/00671* (2013.01); *G06K 9/00691* (2013.01); *G06K 9/6215* (2013.01); *G06Q 30/0283* (2013.01); *G06Q 30/0633* (2013.01); *G06T 7/0002* (2013.01); *G06T 7/0004* (2013.01); *G06T 2207/10016* (2013.01); *G06T 2207/30184* (2013.01); *H04N 5/77* (2013.01); *Y10S 707/949* (2013.01)

(58) Field of Classification Search
CPC ............ G06K 9/00671; G06K 9/00691; G06T 7/0002; Y10S 707/949
See application file for complete search history.

(56) References Cited

U.S. PATENT DOCUMENTS

| | | | |
|---|---|---|---|
| 8,239,293 B2 * | 8/2012 | Gounares | G06Q 10/10 705/28 |
| 8,756,085 B1 * | 6/2014 | Plummer | G06Q 40/08 705/4 |
| 9,805,261 B1 * | 10/2017 | Loveland | B64F 5/60 |
| 9,823,658 B1 * | 11/2017 | Loveland | G01C 11/02 |
| 9,928,553 B1 * | 3/2018 | Harvey | G06K 9/00637 |
| 10,102,589 B1 * | 10/2018 | Tofte | B64C 39/024 |

(Continued)

FOREIGN PATENT DOCUMENTS

| | | | | |
|---|---|---|---|---|
| WO | WO-2018098551 A1 * | 6/2018 | | G01B 11/303 |

OTHER PUBLICATIONS

S. Zollmann, C. Hoppe, S. Kluckner, C. Poglitsch, H. Bischoff, & G. Reitmayr, "Augmented Reality for Construction Site Monitoring and Documentation", 102 Proc. IEEE 137-154 (Feb. 2014) (Year: 2014).*

*Primary Examiner* — David N Werner
(74) *Attorney, Agent, or Firm* — Piumsea Law Group, LLC

(57) ABSTRACT

A method of automatically detecting damage following a loss causing incident is disclosed. The method includes capturing image information about a group of physical objects in their initial states and comparing these with image information about the group of physical objects in their modified states following a loss causing incident. The method includes detecting discrepancies between the initial and modified states and automatically assesses the degree of damage and/or loss.

20 Claims, 12 Drawing Sheets

(56) References Cited

U.S. PATENT DOCUMENTS

| | | | | |
|---|---|---|---|---|
| 10,137,984 B1* | 11/2018 | Flick | ............... | G08G 5/006 |
| 10,672,080 B1* | 6/2020 | Maurer | ............... | G06Q 20/34 |
| 2002/0035522 A1* | 3/2002 | Pilcher | ............... | H04N 1/2195 |
| | | | | 705/28 |
| 2006/0178902 A1* | 8/2006 | Vicars | ............... | G06T 1/0021 |
| | | | | 705/51 |
| 2008/0212899 A1* | 9/2008 | Gokturk | ............... | G06Q 30/0603 |
| | | | | 382/305 |
| 2009/0164421 A1* | 6/2009 | Pacella | ............... | G06F 16/2453 |
| 2010/0135582 A1* | 6/2010 | Gokturk | ............... | G06Q 30/0603 |
| | | | | 382/195 |
| 2012/0265633 A1* | 10/2012 | Wohlstadter | ............... | G06Q 50/16 |
| | | | | 705/26.3 |
| 2013/0121571 A1* | 5/2013 | Gokturk | ............... | G06F 16/5854 |
| | | | | 382/165 |
| 2016/0180468 A1* | 6/2016 | Buss | ............... | G06K 9/00691 |
| | | | | 705/4 |
| 2016/0313736 A1* | 10/2016 | Schultz | ............... | G06T 11/60 |
| 2017/0050319 A1* | 2/2017 | Zhou | ............... | B25J 9/1697 |
| 2017/0052070 A1* | 2/2017 | Marsh | ............... | G06K 9/00671 |
| 2017/0076393 A1* | 3/2017 | Cohen | ............... | G06Q 40/08 |
| 2017/0293894 A1* | 10/2017 | Taliwal | ............... | G06K 9/00671 |
| 2018/0082451 A1* | 3/2018 | Dey | ............... | G06F 9/453 |
| 2018/0225839 A1* | 8/2018 | Yoshida | ............... | G06K 9/00201 |
| 2018/0268220 A1* | 9/2018 | Lee | ............... | G06K 9/4642 |
| 2018/0364059 A1* | 12/2018 | Calinao | ............... | G06N 20/00 |
| 2019/0180105 A1* | 6/2019 | Sasson | ............... | G06Q 40/12 |
| 2019/0188796 A1* | 6/2019 | Sauer | ............... | G06K 9/00671 |
| 2019/0188811 A1* | 6/2019 | Sasson | ............... | G06T 7/0004 |
| 2019/0236365 A1* | 8/2019 | Speasl | ............... | G06K 9/00671 |
| 2019/0236565 A1* | 8/2019 | Song | ............... | G06Q 20/3829 |
| 2019/0304150 A1* | 10/2019 | Zweigle | ............... | H04N 13/271 |

* cited by examiner

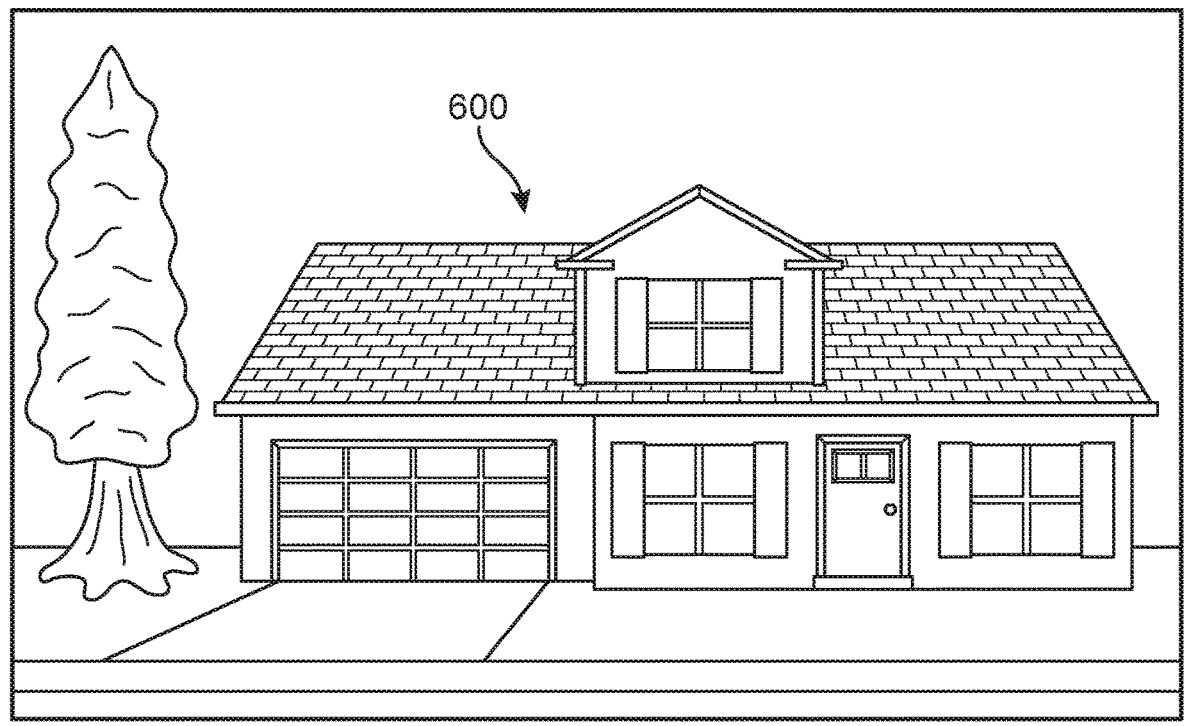
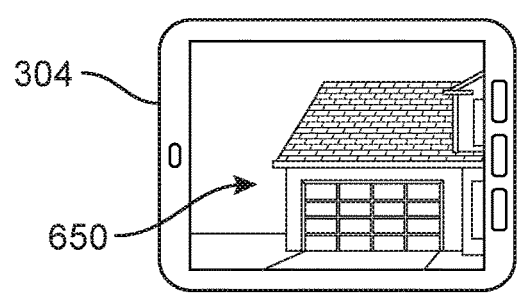
FIG. 6

AUGMENTED REALITY METHOD FOR REPAIRING DAMAGE OR REPLACING PHYSICAL OBJECTS

CROSS-REFERENCE TO RELATED APPLICATIONS

This application claims the benefit of Provisional Patent Application No. 62/722,215 filed Aug. 24, 2018, and titled "Augmented Reality Method For Repairing Damage or Replacing Physical Objects," which is incorporated by reference herein in its entirety.

TECHNICAL FIELD

The present disclosure generally relates to an augmented reality method of determining damage to physical objects and repairing or replacing those physical objects.

BACKGROUND

Home owners often obtain insurance to offset losses (or damages) of a home and/or valuables. Insurance companies may require customers to fill out complicated inventory forms listing valuables in the home, including a physical description and monetary value for each item to be insured. Because these forms may be tedious to fill out, customers may be disinclined to fill them out accurately and/or at all.

After an incident (such as a storm, theft, etc.) a customer may file a claim with the insurance company, at which time an adjuster comes to assess any potential damage and/or loss. This may be a time-consuming process as a customer waits for an appointment with the adjuster to learn the estimated cost for repairing and/or replacing items. Moreover, individual adjusters may use different methods for assessing the value of damaged or lost items as well as estimated costs for repair and/or replacement, leading to less predictability in claim payments by an insurer.

There is a need in the art for a system and method that addresses the shortcomings discussed above.

SUMMARY

In one aspect, a method for determining damage to a group of physical objects includes steps of: capturing a first image, the first image including the group of physical objects, where the first image is taken prior to a loss causing incident, where the group of physical objects are captured in their initial state; capturing a second image, the second image including the group of physical objects, where the second image is taken after the first image and also after the loss causing incident, and where the group of physical objects are captured in their modified state; and detecting differences between the group of physical objects in their initial state and the group of physical objects in their modified state.

In another aspect, a method for automatically replacing a physical object after a loss causing incident includes steps of: capturing a first image, the first image including the physical object, where the first image is taken prior to a loss causing incident, where the physical object is captured in its initial state; capturing a second image, the second image including the physical object, where the second image is taken after the first image and also after the loss causing incident, where the physical object is captured in its modified state; detecting differences between the physical object in its initial state and the physical object in its modified state; determining that the physical object needs to be replaced; determining a replacement cost for the physical object; and replacing the physical object.

In another aspect, a method of visualizing damage to a physical structure includes steps of capturing a first image, the first image including the physical object, where the first image is taken prior to a loss causing incident, where the physical object is captured in its initial state; capturing a second image, the second image including the physical object, where the second image is taken after the first image and also after the loss causing incident, where the physical object is captured in its modified state; detecting differences between the physical object in its initial state and the physical object in its modified state; displaying the physical object in its modified state; and providing a transformation tool, where the transformation tool can be used to transform the displayed physical object from its modified state to its initial state.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 6 is a schematic view of a step of capturing an image of a house in an initial state, according to an embodiment;

DESCRIPTION OF EMBODIMENTS

The embodiments provide a system and method for automatically assessing damage to, or loss of, one or more physical objects using image recognition and augmented reality. Specifically, the embodiments provide a system and method for automatically creating an inventory of physical objects using images and/or other data. By automatically generating the inventory from image data, the method improves the efficiency of creating an initial inventory of items to be insured against damage or loss, which may improve customer experience. Moreover, using an automated system improves the accuracy of the inventory and may help reduce fraud that may occur when customers advertently or inadvertently misremember details about damaged or lost items (for example, TV size, model, etc.). The system and method further reduces the need for an adjuster to manually assess damage and/or loss, thereby saving time and/or costs for all parties. The system and method may further improve the consistency/reliability of assessing damage and/or loss by relying less on the decisions of individual adjusters. Still further, the system and method can help improve security. For example, increasing the reliability of inventory information may improve the ability of an insurer or other parties to track lost objects and possibly identify previously stolen objects.

The embodiments make use of methods and systems in artificial intelligence. As used herein, "artificial intelligence" may include any known methods in machine learning and related fields. As examples, artificial intelligence may include systems and methods used in deep learning and machine vision.

Figure 1:
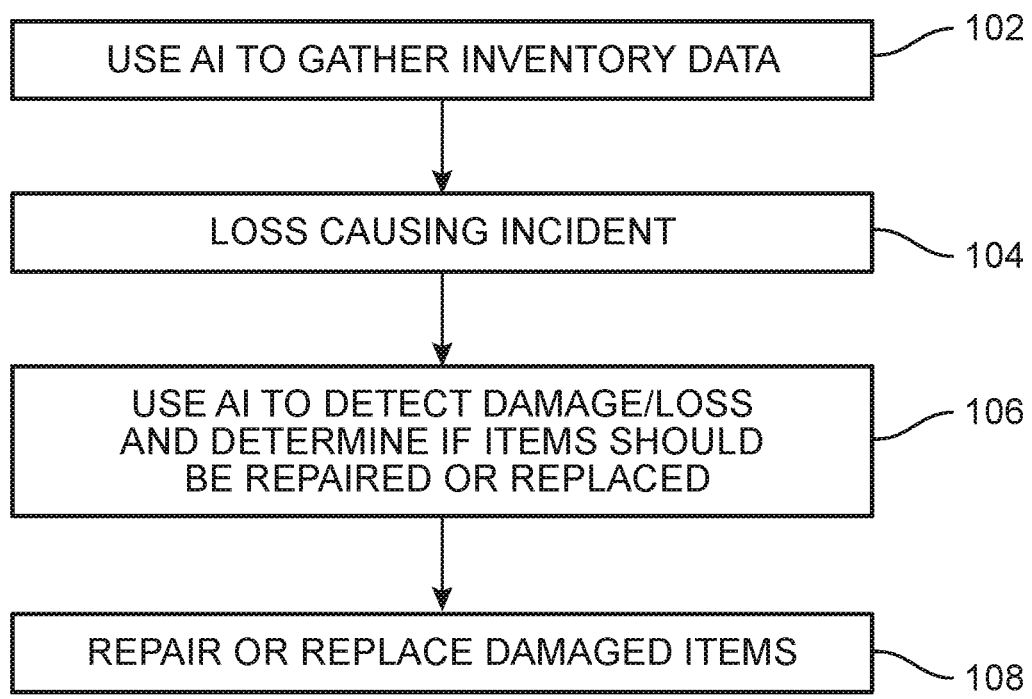
FIG. 1 is a schematic process of assessing damage and repairing/replacing damaged items, according to an embodiment.

Referring to FIG. 1, a method of automatically repairing or replacing lost or damaged objects may include one or more of the following steps. First, in step 102, a method may use artificial intelligence to gather inventory data related to a group of physical objects. The term "inventory data" refers to any information related to a group of physical objects. Inventory data may include, but is not limited to, image data, price and/or other purchase data, product or serial numbers, physical attributes (for example, dimensions, color, brand) as well as other kinds of data. As an example, the inventory data may be related to a group of physical objects in a home. For a television, the inventory data could include the purchase price of the television, the dimensions (for example, screen size), the brand, the model number as well as a photo of the television taken at the home.

Gathering inventory data can include one or more steps. For example, gathering inventory data may include taking photos or videos of a group of physical objects. Gathering inventory data may also include automatically identifying an object from a photo or video (for example, using machine vision). Also, gathering data may include searching for various kinds of information related to an identified physical object. For example, after a system identifies a physical object as a television, the system may automatically search any of the television owner's available purchase history records to determine a purchase price, brand and/or model number.

Gathering inventory data may happen prior to a loss causing incident, which occurs in step 104. A loss causing incident may be any incident or event where one or more objects are lost, destroyed or otherwise damaged, thereby losing value for an owner of the objects. In other embodiments, inventory data may also be collected after a loss causing incident to identify broken objects.

After the loss causing incident has occurred, the method may use artificial intelligence to detect damage or loss and assess whether one or more objects need to be repaired or replaced in step 106. Finally, in step 108, the method may include taking steps to repair and/or replace any damaged (or lost) objects/items.

Figure 2:
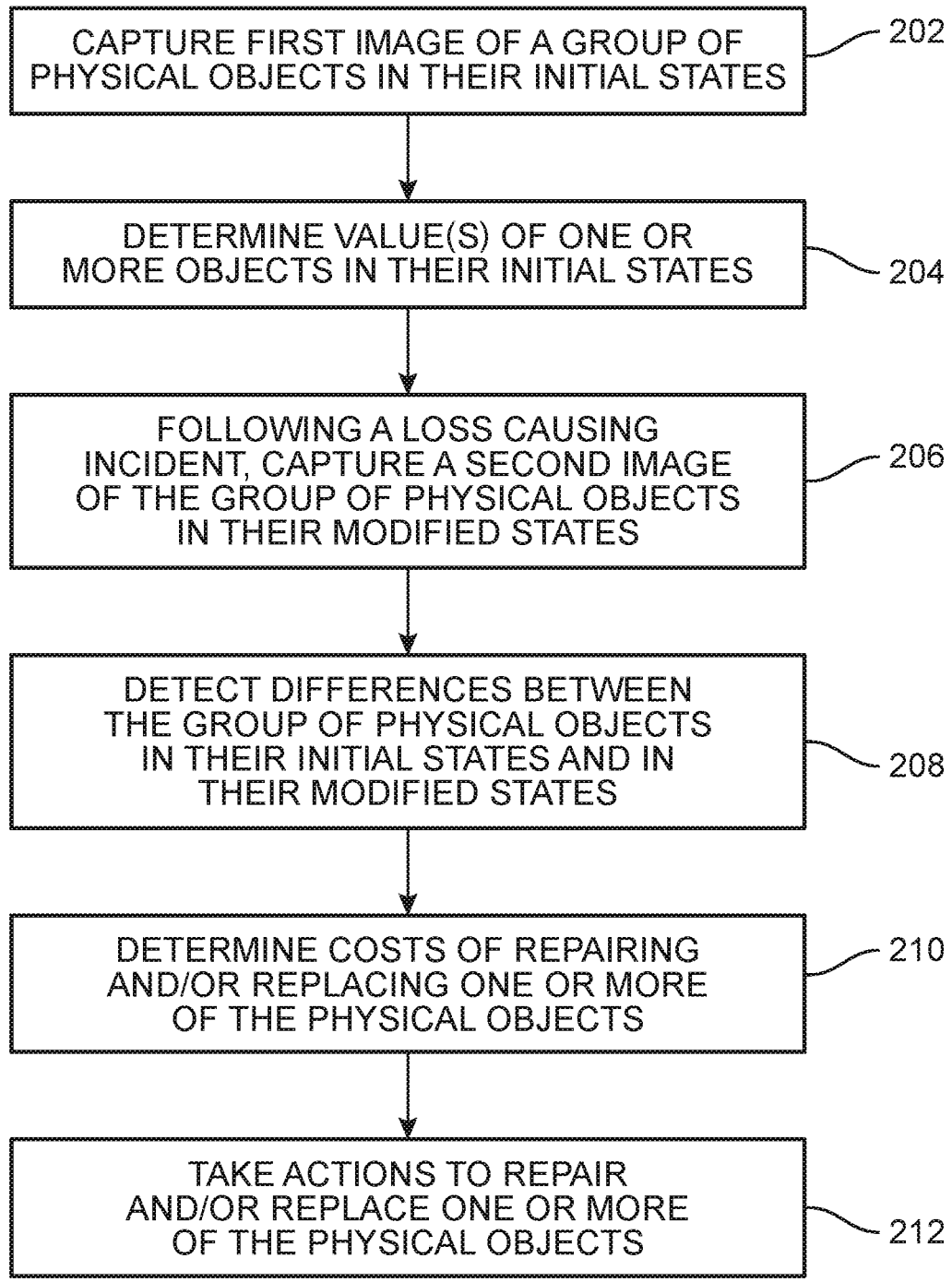
FIG. 2 is a schematic process of determining damage to a group of physical objects, according to an embodiment.

FIG. 2 is a schematic view of a process for automatically repairing and/or replacing one or more physical objects. First, in step 202, the method may include capturing a first image of a group of physical objects in their initial states. The initial states of the physical objects may be initial relative to a particular loss causing incident (or loss event). As used herein, the term "capturing an image" may refer to taking a single image (for example, a photo) or capturing an image as part of a sequence of images that form a video. Thus, it may be understood that step 202 may encompass both taking still images and taking videos.

In step 204, the method can include determining the value of one or more physical objects that were captured in the first image. This step can include identifying one or more physical objects in the first image using image recognition and/or machine vision algorithms.

After a loss causing incident, in step 206, the method may include capturing a second image of the group of physical objects in their modified states. The modified state of a physical object refers to its modification relative to an initial state. For example, a television may be undamaged in its initial state, but following a hurricane (a loss causing event) the modified state of the television may include a shattered screen.

During step 208, the method may include detecting differences between the group of objects in their initial states and in their modified states. This step could include comparing the first image and the second image to see how the visual condition of one or more physical objects has changed. This step may include using various kinds of machine vision algorithms, feature detection algorithms, or other known algorithms for identifying differences in two images or models that may be constructed using the first and second images.

Next, during step 210, the method can include automatically determining costs for fixing and/or replacing one or more of the physical objects. This step may include using artificial intelligence to automatically gather and/or predict the costs for materials and/or labor for repairs. This step may also include using artificial intelligence to automatically gather and/or predict the costs for replacing an object. Finally, in step 212, the method can include taking actions to repair and/or replace one or more of the physical objects.

Although the exemplary process of FIG. 2 describes taking first and second images, it may be understood that any number of images or videos capturing a group of physical objects in the initial and modified states could be used. Various kinds of imaging devices could be used, including phones, tablets or other computing devices with cameras, digital cameras and/or other known imaging devices.

In other embodiments, a baseline for comparing changes in an object could be determined using a 2D or 3D model of the object, rather than an image of the object in its initial condition. For example, if a house is damaged after a storm but no images of the house exist in its initial condition (i.e., its pre-storm condition), then it may be possible to use an architectural model of house as a baseline to compare with images of the house after the storm in order to detect possible damage.

Some embodiments may comprise a system that performs some or all of the functions described above automatically, including automatically generating inventory data from images as well as other data sources, as well as automatically determining the amount of damage occurring after a loss causing incident, automatically estimating costs for repairs and/or replacement and automatically ordering repairs and/or replacement objects. Other embodiments may incorporate a combination of automated features that may be supplemented by various kinds of manual input. For example, in another embodiment a system could automatically detect damage and an adjuster could prepare an estimate for repair costs based in part on the automatically detected damage. In another embodiment, a system could automatically detect damage and provide estimated repair costs, and a customer could use the estimated costs to hire a contractor to perform the repairs.

A system capable of performing one or more of the steps described above in an automated manner may include features for capturing/gathering information about one or more objects, features for analyzing object data, features for estimating costs and/or preparing customer quotes, and features automatically hiring contractors and/or ordering items.

Figure 3:
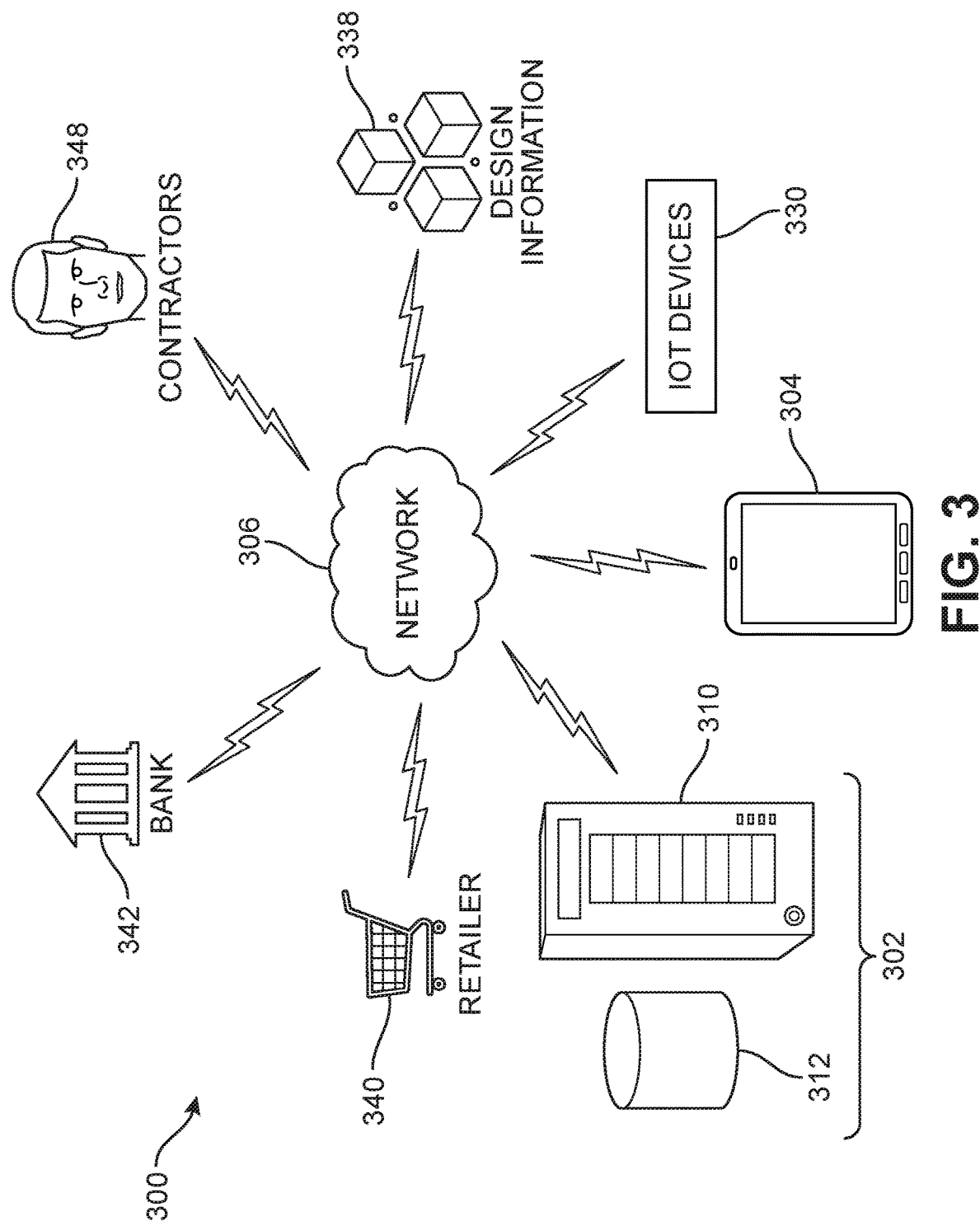
FIG. 3 is a schematic view of a system for assessing damage and repairing/replacing damaged items, according to an embodiment.

FIG. 3 is a schematic view of an embodiment of a damage management system 300. A damage management system may include various sub-systems for inventory, claim assessment, claim adjustment and inventory repair and/or replacement following damages to one or more objects due to a loss causing incident.

Damage management system 300 may comprise a centralized manager 302 and a remote device 304 that may communicate with one another through a network 306. Centralized manager 302 may gather inventory information, perform various kinds of analyses, provide damage estimates or costs, and take one or more actions to repair and/or replace physical objects in an inventory. To gather information, centralized manager 302 may receive various kinds of information from remote device 304. Whereas centralized manager 302 may be located anywhere, remote device 304 may be located on site (for example, at a customer's house or business) to facilitate gathering inventory information before and/or after a loss causing incident.

In the embodiment of FIG. 3, centralized manager 302 comprises one or more servers 310 that may be in communication with one or more databases 312. Each server may be a single computer, the partial computing resources of a single computer, a plurality of computers communicating with one another, or a network of remote servers. Databases 312 could be local databases co-located with servers 310 or could be remote databases that are accessible by servers 310 over network 306.

Remote device 304 may comprise any device capable of capturing image information and/or other kinds of electromagnetic information. Remote device 304 may also comprise any device capable of storing and/or transmitting captured information. In the exemplary embodiment of FIG. 3, remote device 304 comprises a tablet computing device. In other embodiments, however, a remote device could comprise a smartphone, a laptop, or similar kind of device. Remote device 304 may run one or more applications that facilitate the gathering of inventory information. These applications could be native to the device's operating system or web-applications that run on a browser. To gather image data remote device 304 may include a camera for capturing still images and/or video data. A remote device may also comprise one or more physical buttons and/or may implement touch-screen controls.

The components of system 300 may communicate over network 306. In some embodiments, the network may be a wide area network ("WAN"), for example, the Internet. In other embodiments, the network may be a local area network ("LAN"). In yet other embodiments, the network may be a combination of a WAN and a LAN.

System 300 can include features to facilitate gathering information about one or more physical objects. Each feature can be provided by a single sub-system or component, or may be distributed across multiple sub-systems or components.

Remote device 304 may be used to capture images of one or more physical objects. This image information can be used by system 300 to identify and catalogue an object, as well as to provide information about the state of the object. In some embodiments, information about one or more physical objects could also be captured by other devices, including various internet-of-things (IOT) devices 330. In one embodiment, images of one or more physical objects captured by a networked surveillance camera could be uploaded to centralized manager 302 for use in detecting damage.

System 300 may include features for gathering additional information about objects that have been identified via an image or other input. Specifically, system 300 may have access to various kinds of information related to the object, including purchase history, product specifications, architectural drawings (i.e., for houses or other buildings), 2D or 3D models of the object prepared by the manufacturer or a third party, as well as possibly other kinds of information.

In FIG. 3, system 300 may receive various kinds of design information 338 from one or more vendors. In some embodiments, 2D or 3D models can be used in place of an image of an object its initial (undamaged) state. To detect damage a system may compare images of a modified object with information from the 2D or 3D model of the object.

As seen in FIG. 3, a customer can give centralized manager 302 access to user information from retailers 340 and banks 342 (or credit card companies) to obtain purchase information (for example, price paid, date of purchase, condition of item at the time of purchase, etc.), product information (for example, brand, model or serial number, dimensions, warranty information, etc.) as well as other kinds of information.

System 300 can include features for analyzing information. Specifically, system 300 may include software for image recognition, damage detection, and algorithms for predicting cost estimates for repairing and/or replacing objects. The software for these analyses may be run on the servers of centralized manager 302, on remote device 304 and/or may be distributed across centralized manager 302 and remote device 304. Optionally, some types of analyses may be run via a separate cloud service.

The embodiments may make use of any known methods, techniques, or algorithms in machine vision and feature detection to identify and classify objects. Embodiments may use any known image processing methods such as stitching/ registration, filtering, thresholding, pixel counting, segmentation, edge detection, color analysis, blob detection, pattern recognition or template matching, optical character recognition as well as other known methods. Some embodiments may use the scale-invariant feature transform (SIFT) algorithm that is used in object recognition, robotic mapping and image stitching.

Embodiments can also make use of any known methods, techniques, or algorithms in robotics and/or navigation. For example, some embodiments may utilize the well known simultaneous localization and mapping (SLAM) technique for constructing and updating a map of an unknown environment and determining the location of an agent within the map. Some implementations of SLAM can be used to help determine distances between objects, or dimensions of objects, within an image.

System 300 can include features for taking actions related to repairing and/or replacing parts. To facilitate estimating repair costs, system 300 may have the ability to identify the geographic region of the customer and look-up prices for parts and/or labor for that geographic region. System 300 may also include information about contractors/vendors, including rates, ratings and historical information based on previous times the system has engaged a particular contractor.

System 300 may be able to automatically request repairs, for example by filling out an online form provided by a contractor 348 or by submitting a request by email. Likewise, when system 300 determines that a part or physical object requires replacement, system 300 may automatically place an order for a new part or object. As an example, system 300 may be connected to an online retailer 340 and may submit orders on the customer's behalf.

A method of damage or loss management can include one or more of the steps depicted in FIGS. 4-10. Specifically, in some embodiments, the method includes steps of collecting inventory inside a home (FIGS. 4-6) and outside a home (FIG. 7), prior to a loss causing incident. To identify and create an inventory of physical objects a customer (or an adjuster) may walk through (and around the outside of) a home and take images (photos or video) of all the physical objects that need to be inventoried. For larger objects, such as television 402 and television stand 404 shown in FIG. 4, this may simply involve moving through the house and capturing images of these objects. For smaller objects, such as jewelry 406, this may require the customer and/or adjuster to collect and arrange the objects on table 407 or other location where the objects can more easily captured.

Figure 4:
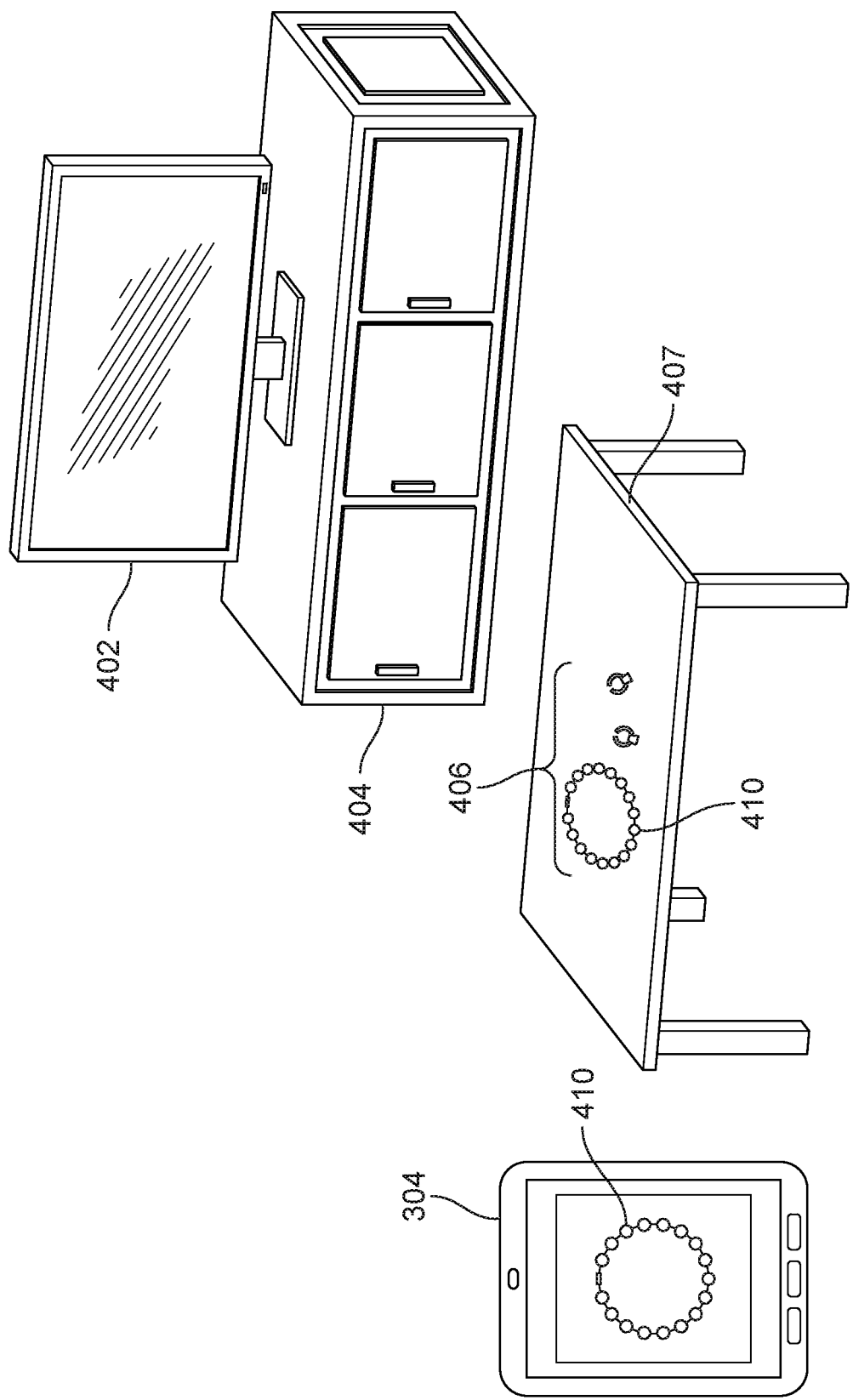
FIG. 4 is a schematic view of a step of capturing image data for a group of physical objects, according to an embodiment.

As seem in FIG. 4, remote device 304 is used to capture an image of necklace 410 in its initial state. In some cases, for expensive, unique or uncommon items such as jewelry, a system may request that the customer upload additional information about the item separately. For example, a customer may be asked to upload a receipt (i.e., an electronic receipt or an image of a physical receipt) to help the system determine the purchase price, vendor where the item was purchased, etc. In some embodiments, a system may use historical data to help identify and/or value certain kinds of specialty objects.

Figure 5:
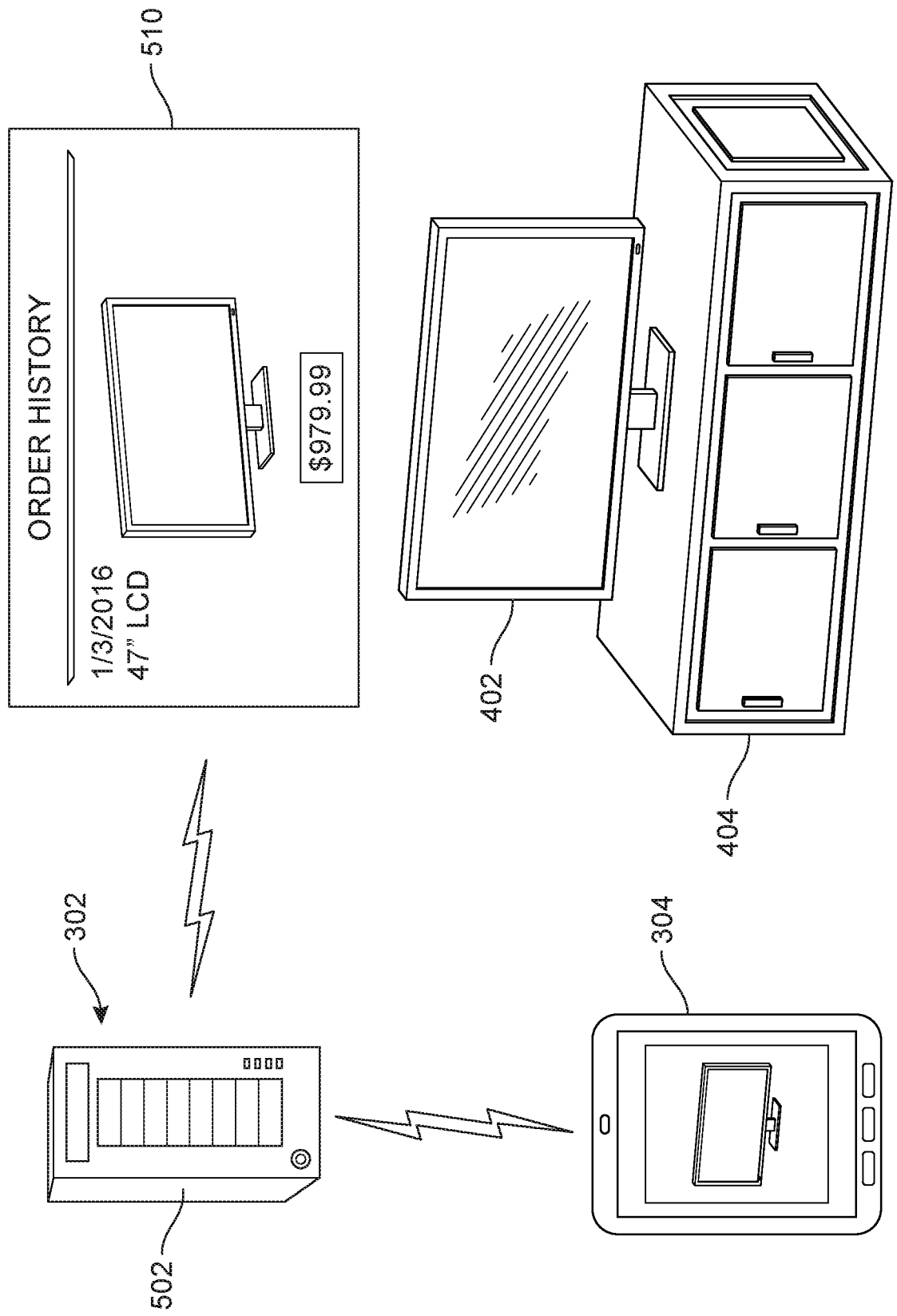
FIG. 5 is a schematic view of a step of capturing image data for a group of physical objects and automatically retrieving a purchase price for one of the objects, according to an embodiment.

As seen in FIG. 5, remote device 304 may be used to take an image of television 402. In some embodiments, image data corresponding to television 402 may be sent to a server 502 associated with centralized manager 302. Centralized manager 302 may then obtain access (for example, via the cloud) to the customer's order history information, including the order history 510 for television 402. This allows centralized manager 302 to automatically determine the price that the customer paid for television 402, without requiring the customer to look-up, or recall from memory, the price they paid.

The inventory of physical objects (such as television 402 and jewelry 406) may be used to provide an estimated value of objects to be insured against loss and/or damage. By automating the inventory process the present methods help increase the accuracy of an inventory. The method also reduces the burden on the customer to manually track down and input information (for example, pricing information, vendor information, etc.) into a form. The method also increases the likelihood that an inventory of physical objects will be created prior to a loss causing event because the process is less tedious than conventional processes.

FIGS. 6-10 illustrate an embodiment in which the present methods can be used to help automatically create estimated costs and schedule repairs to fix a house after a loss causing event. While the present example depicts using this method for a home, it may be appreciated that similar principles could be applied to other consumer items such as cars, boats, and to other types of residential or commercial buildings. A similar method may also be used with smaller consumer items, such as televisions, furniture, jewelry or any other items.

Figure 7:
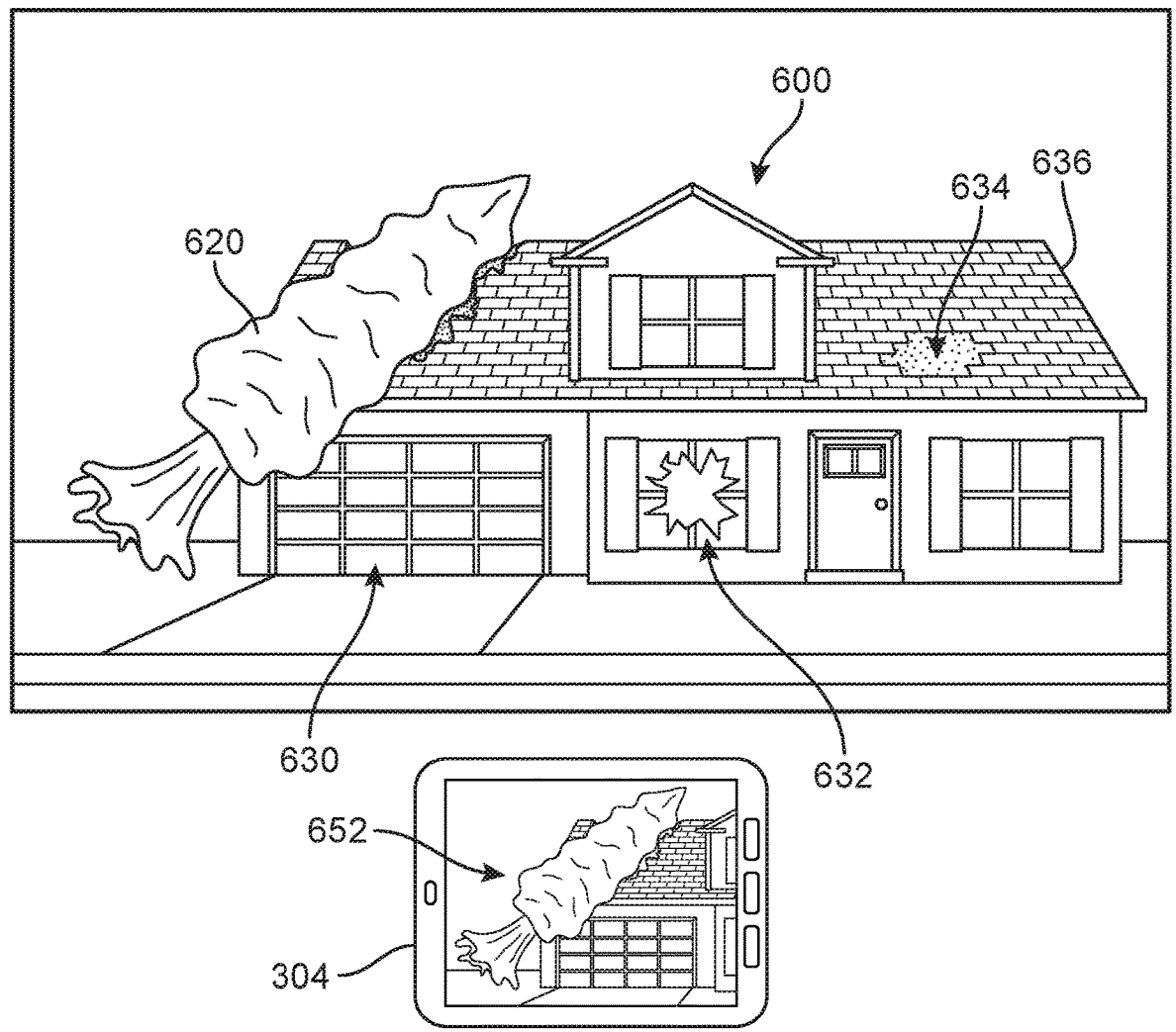
FIG. 7 is a schematic view of a step of capturing an image of the house of FIG. 6 in a modified state, according to an embodiment.

Referring first to FIG. 6, a user (i.e., a customer or an adjuster) may capture images (photos or video) of a house 600 using remote device 304. Specifically, images 650 are collected while house 600 is in its initial state (i.e., its state prior to a loss causing event). This activity corresponds with step 202 in FIG. 2. After a loss causing event, a user may capture images 652 of house 600 in its modified state (i.e., its state after the loss causing event), as shown in FIG. 7. This activity corresponds with step 206 in FIG. 2. Referring to FIG. 7, a storm (the loss causing incident) has resulted in damage to house 600. Specifically, a tree 620 has crashed through the roof of garage 630, window 632 has been broken and some shingles have been damaged within region 634 of roof 636.

Figure 8:
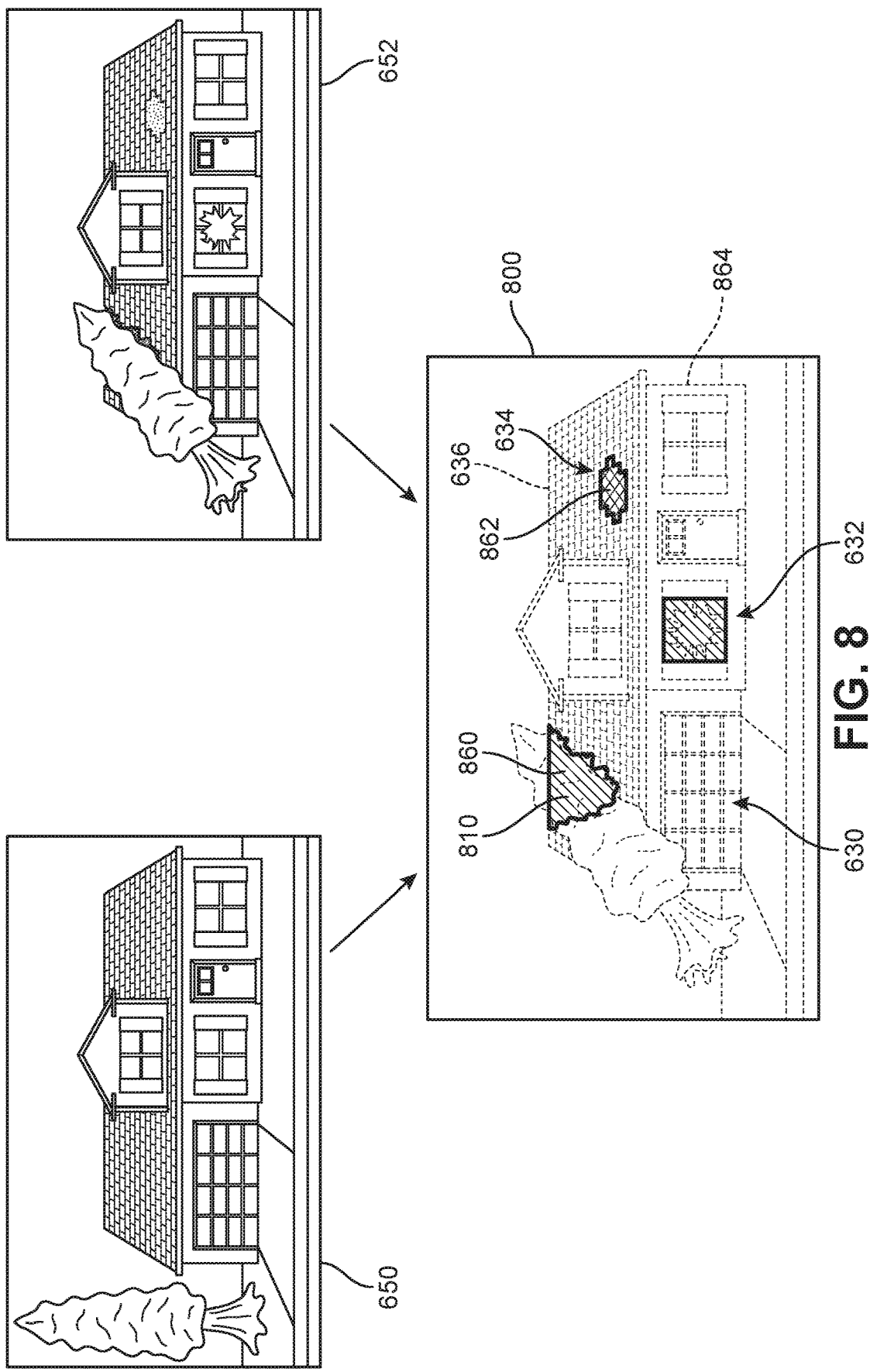
FIG. 8 is a schematic view of a step of detecting damage in the house of FIGS. 6-7, according to an embodiment.

After the image and/or other information has been captured for the house in its initial and modified states, a damage management system may detect differences between the initial and modified states of house 600. This activity corresponds with step 208 in FIG. 2. Referring to FIG. 8, the damage management system uses information from the images 650 of the initial state and information from images 652 of the modified state to detect one or more differences. The detected differences may indicate damaged regions and/or damaged structures. For purposes of illustration, the detected differences are indicated schematically in an image 800, though it may be appreciated that in some cases a system may not generate a visualization of detected discrepancies.

As seen in FIG. 8, the system has automatically detected a damaged region 810 of roof 636 at garage 630. In addition, the system has automatically detected damaged window 632. The system has also automatically detected damaged region 634 of roof 636.

Although not depicted in the exemplary embodiment, a damage management system could incorporate features for analyzing potential damage done to surface features on a house such as stone, granite, siding, etc. In some embodiments, image information of a house in its initial state can be used to identify the surface material and the percentage of the house covered in the material. Post incident analysis may then be used to identify what percentage of the original coverage is damaged/lost and in need of repair or replacement.

Once damage has been detected, the system may automatically determine the extent of the damage and provide an estimated cost for fixing the damage. Analyzing the extent of the damage the system may include various techniques. In one embodiment, a system could detect heat signatures, for example using infrared sensors on a remote device or other available sensor, to determine possible locations of damage after fires. In another embodiment, a system could overlay lightning strike data, which may be available from a third party service, in combination with geospatial information to determine locations on a structure (such as a house or other building) where lighting may have hit and damaged the structure. Other methods for detecting and assessing damage could include analyzing Wi-Fi signal information (for example, signal strength) before and after a loss causing event to determine if structural damage has been done. For example, a damage management system may incorporate an application running on a remote device that can analyze Wi-Fi signal strength through walls and other structures in a house to determine if one or more structures are damaged/destroyed.

In some embodiments, a system could incorporate models that help to differentiate between damage from a loss causing incident and normal wear and tear. For example, a model could be used to differentiate between damage to roof shingles from a storm compared to normal wear and tear of shingles over time.

In embodiments where the system can automatically detect distances within an image (for example, using SLAM algorithms), the system can automatically measure the absolute size (for example, area) of damaged regions. In contrast, conventional methods may require an adjuster to make physical measurements with a tape measure to determine the approximate size of any damaged regions.

In some embodiments, a system may provide a visualization of detected damage to a user. A visualization allows a user to verify that the system has correctly identified locations of damage. The visualization may inform the user of damage that may not be obvious from visual inspection of a structure. In some embodiments, the type of damage can be displayed with different colors or other patterns. For example, in the exemplary embodiment of FIG. 8, a first pattern 860 is used to display damage that is in urgent need of repair/replacement. A second pattern 862, in contrast, indicates damage that may not need immediate replacement. Moreover, the remainder of the house can be visualized using a third pattern 864, indicating regions with no damage at all.

Figure 9:
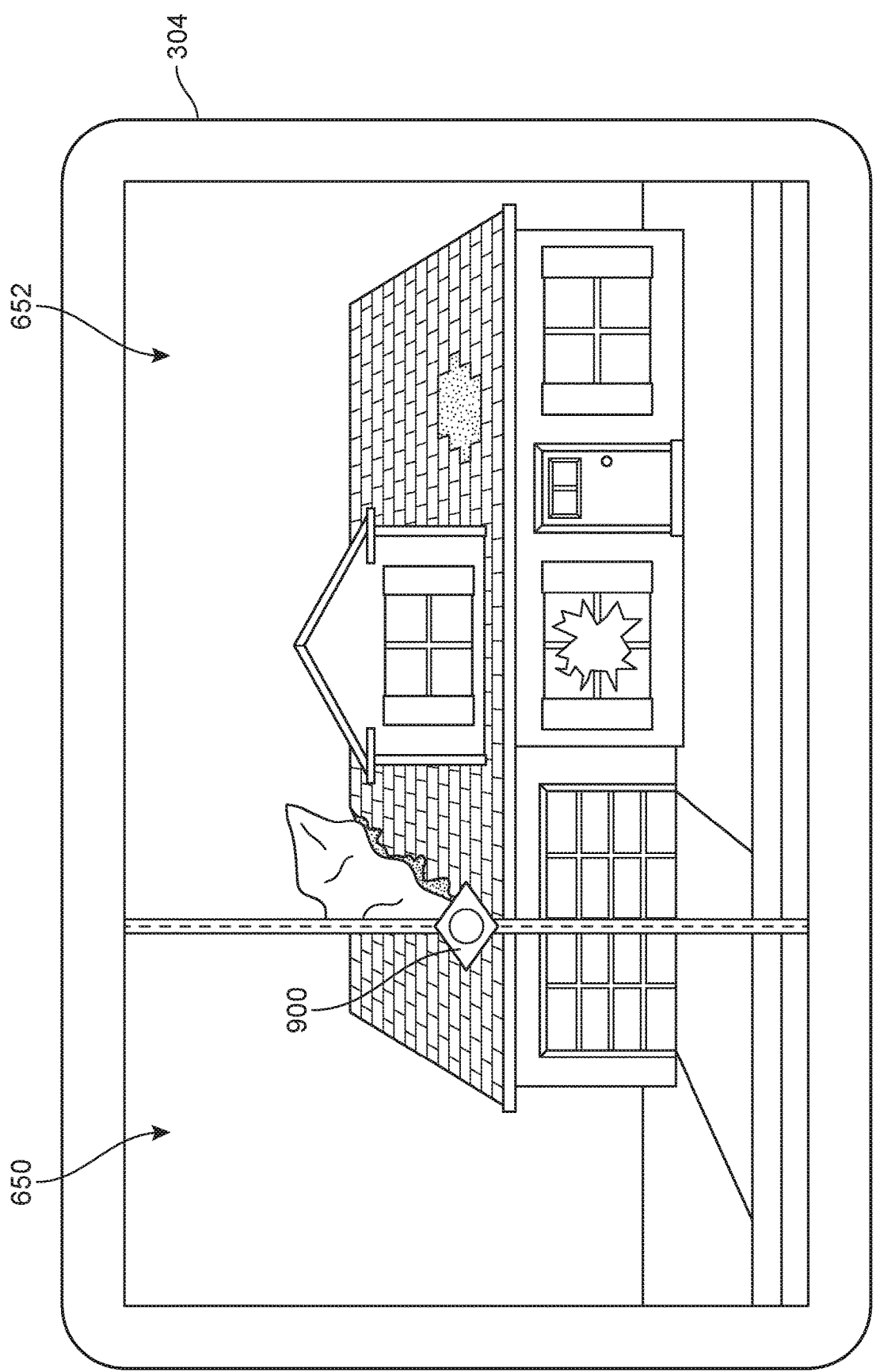
FIGS. 9-10 are schematic views of a system for visualizing damage in the house of FIGS. 6-7, according to an embodiment.
Figure 10:
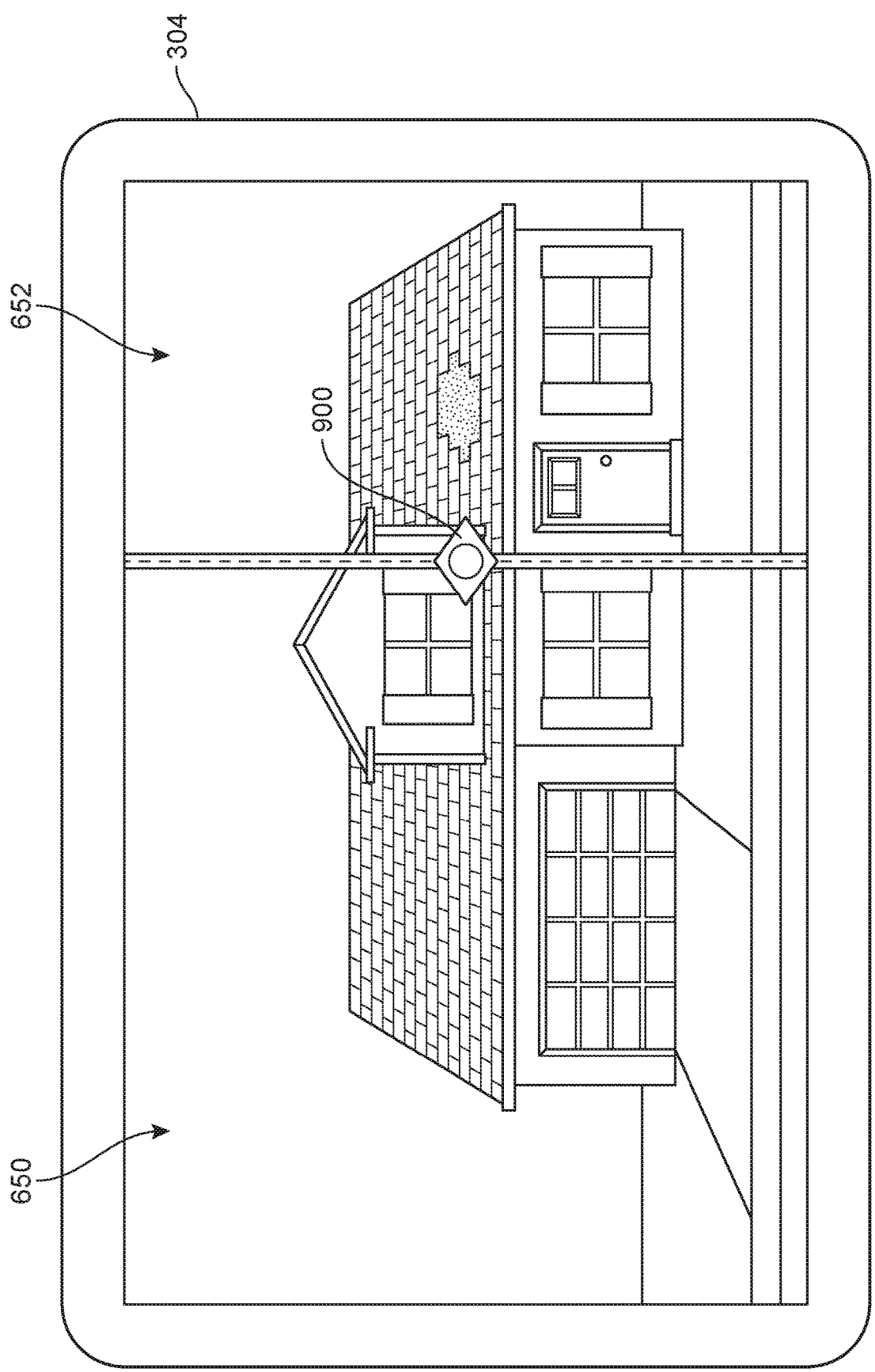

FIGS. 9-10 illustrate an optional visualization tool that can be provided for a user, including either a customer or an adjuster. This tool allows a user to transition seamlessly between an image of a physical object in its initial state and in its modified state. In some embodiments, the visualization includes a transformation tool. The transformation tool may be a sliding window that divides a display space for displaying a physical object into a first display portion and a second display portion that are separated by a sliding boundary. The first display portion is configured to display a portion of the physical object in its initial state and the second display portion is configured to display a portion of the physical object in its modified state. As the sliding boundary of the sliding window is moved the first display portion and the second display portion change sizes.

In the embodiment of FIGS. 9-10, the visualization incorporates a transitioning tool in the form of a sliding widow. Specifically, sliding boundary 900 can be dragged across a screen of remote device 304. As slider 900 is dragged, the image transitions so that on one side of the boundary (i.e., the left in the embodiment of FIGS. 9-10) the physical object is seen in its initial state and on the other side (i.e., the right in the embodiments of FIGS. 9-10) the physical object is seen in its modified state. Sliding back and forth allows a user to more clearly see both the overall extent of damage as well as to located specific regions of damage.

It is contemplated that in some embodiments, the system could use augmented reality to help a user visualize differences in a physical object (for example, a house). For example, rather than using a slider to transition between previously captured images of a physical object, the system can use augmented reality to superimpose projected repairs onto various regions of the object as seen through a live video of the damaged object. Augmented reality techniques can be implemented using various conventional augmented reality frameworks or toolkits.

In order to provide a visualization that smoothly transitions between initial and modified states of one or more objects, a system can include provisions for automatically orienting and/or resizing an image so that images corresponding with an object in its initial state can be overlaid with images corresponding with an object in its final state. Embodiments can use any known methods for reorienting, resizing and/or otherwise modifying objects in images. These may include various machine vision algorithms, SIFT algorithms as well as other kinds of algorithms known for transforming the orientation and size of an object in an image.

Figure 11:
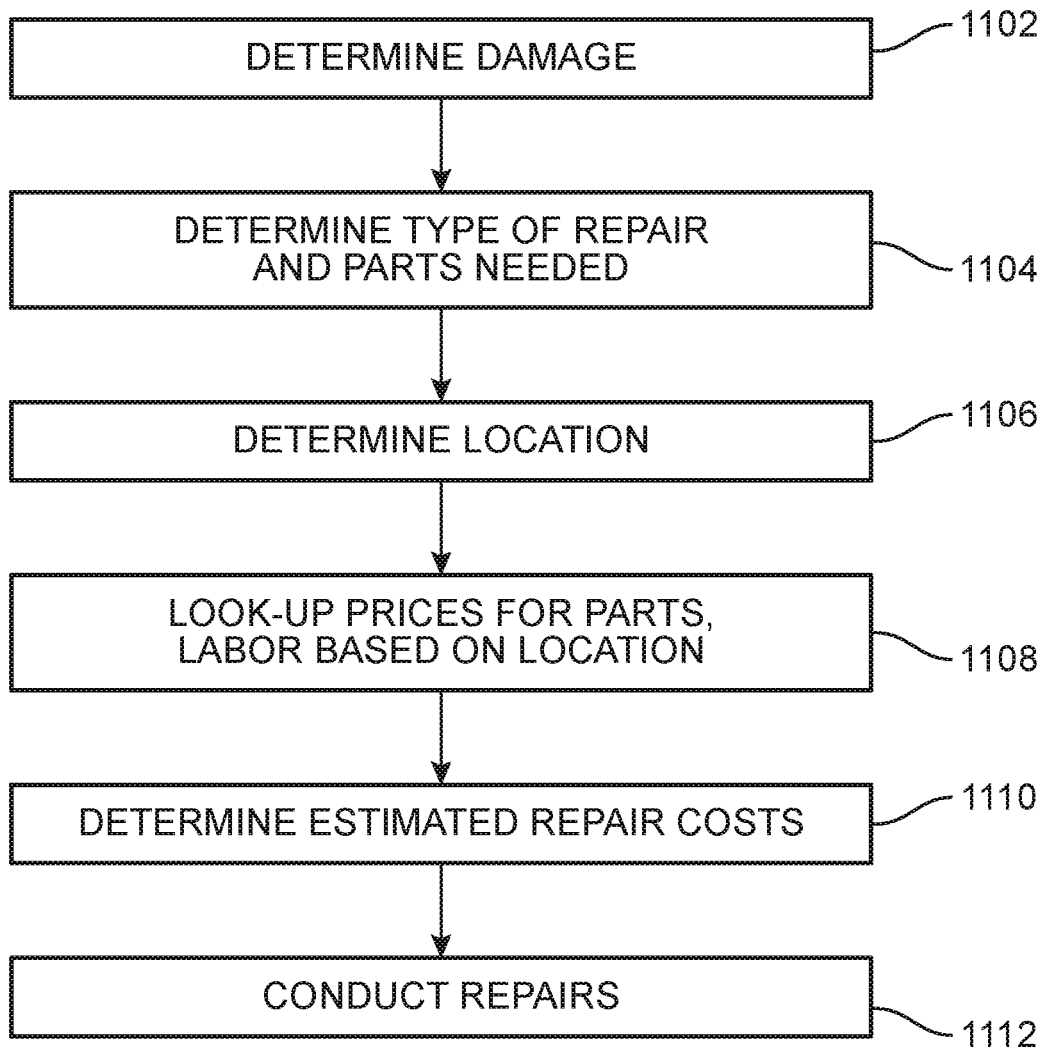
FIG. 11 is a schematic view of a process for determining damage to a physical object and conducting repairs, according to an embodiment.

FIG. 11 is a schematic view of a process for automatically conducting repairs after a loss causing incident. It may be appreciated that in some embodiments, all of the following steps could be performed by a single entity, such as an insurance company that may have ownership of one or more companies for making repairs. In other embodiments, different steps could be performed by different entities. For example, in another embodiment an insurance company could perform some steps (for example, determining the extent of damage) while a separate vendor or contractor could perform other steps (for example, repairs). In the embodiment depicted in FIG. 11, each of the steps is performed a damage management system (for example, damage management system 300 of FIG. 3).

Referring to FIG. 11, in step 1102 the system may determine (i.e., detect) any damage done to one or more physical objects. These objects could include personal items in a home, such as a television, computer, jewelry, furniture, etc. These objects could also comprise items such as vehicles, houses and/or buildings. Next, in step 1104, the system determines the type of repair and parts needed. To determine the type of repair and parts needed the system may use one or more predictive or classification systems that automatically determine what type of repair may be needed according to the damaged structure and/or type of damage. For example, if a system detects that studs or other structural parts of a garage in a house have been damaged, the system can automatically determine that a general contractor will be needed replace the studs and repair drywall, for example. If a system detects that regions of a house including electrical components (for example, wires) have been damaged, the system may automatically determine that an electrician will be required. If a system detects that regions of a house including plumbing have been damaged, the system may automatically determine that a plumber will be required.

Next, in step 1106, the system may determine the location of the customer's house, for example using GPS information determined by a remote device, and/or by retrieving a record of the address of the damaged house. Based on the location, in step 1108, the system could look up prices for parts. In some embodiments, the system can also use the location information to look up, or estimate, local labor costs for various kinds of contractors (plumbers, electricians, general contractors, etc.).

In step 1110, the system may determine estimated repair costs. These may be determined according to the parts and labor estimates and/or according to historical information. In some embodiments, predictive models can be used to more accurately predict repair costs. Such models may use historical information gathered by the system over time as more and more customers have loss causing incidents and require repairs.

Finally, in step 1112, the system can conduct repairs. In some embodiments, an insurer could employee plumbers, electricians, etc. that can make the repairs. In other embodiments, the insurer could hire third party contractors to do the work. In some cases, some or all of the process for hiring contractors could be automated. For example, the system could use a contracting company with online forms that can be filled out automatically by the system so that the contractor gets an estimated budget, type of repair needed and location for making the repairs, all of which have been automatically generated by the system.

In at least some embodiments, the system may automatically order the parts required for repairs. For example, if the system detects that a wall in a house has been severely damaged and will need to be rebuilt, the system can compile a list of parts required for the repairs based on any available models, specification data and/or custom rules. The parts can then be automatically ordered from a local vendor or other retailer and delivered to the house, to a contractor who has been hired to do the repairs and/or some other location.

For smaller items, such as electronics, the system may automatically determine a contractor or vendor to make the repairs. For example, if the system identifies a laptop as having a cracked screen due to a loss causing incident, the system may automatically determine that the laptop should be sent to laptop's manufacturer for repairs. The system may moreover prepare an estimated cost for the repair based on historical data and/or repair costs listed on the vendor site. In some embodiments, upon having the item shipped and repaired (or having it brought to a store for repair) the system may automatically pay the vendor, rather than reimbursing a customer at a later time.

Figure 12:
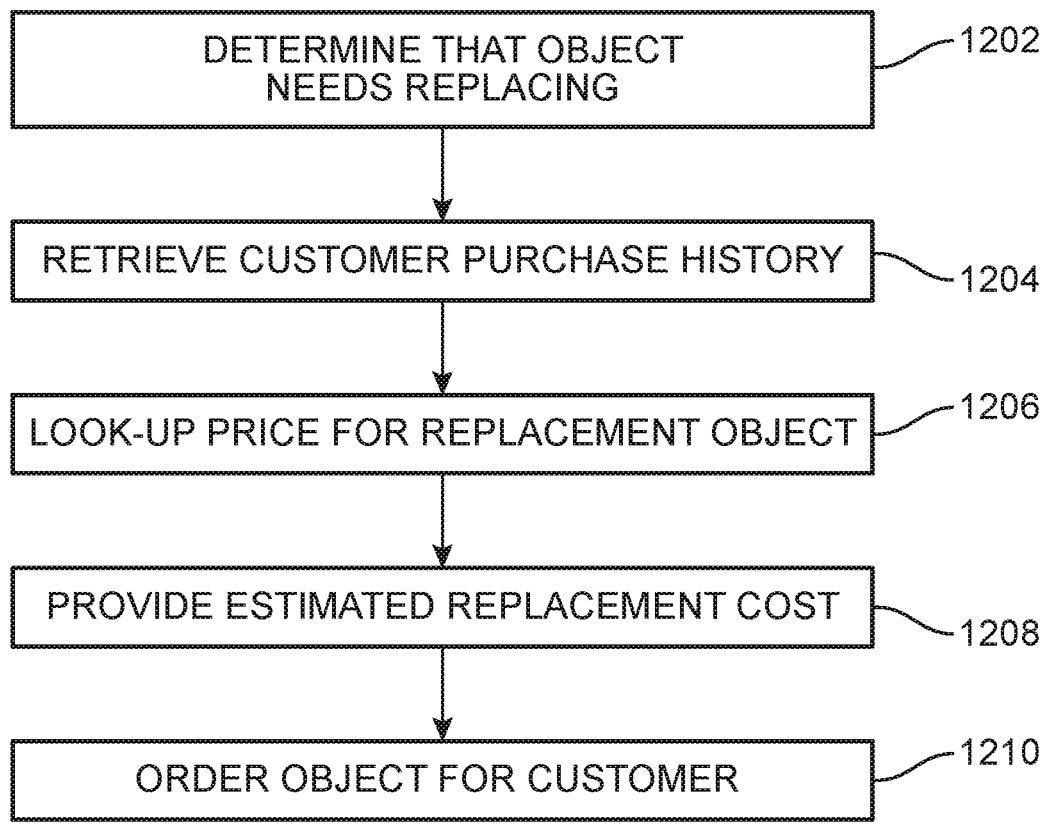
FIG. 12 is a schematic view of a process for assessing damage and ordering a replacement object, according to an embodiment.

FIG. 12 is a schematic view of a process for automatically replacing a physical object after a loss causing incident. It may be appreciated that in some embodiments all of the following steps could be performed by a single entity, such as an insurance company. In other embodiments, different steps could be performed by different entities. In the embodiment depicted in FIG. 11, each of the steps is performed a damage management system (for example, damage management system 300 of FIG. 3).

First, in step 1202, the system may analyze a physical object and determine that it needs replacing because of the degree of damage and/or based on the availability, or cost, of repairs. Next, in step 1204, the system can retrieve the customer's purchase history. This information can be retrieved directly from a local database (for example, databases 312) or from a third party (for example, retailer 340). The information may be an order receipt from a vendor or information from a financial services company (for example, a bank statement or credit card statement indicating a particular transaction). This information can be used to determine the price the customer paid for the object, as well as any details about the object that may be necessary to ensure the replacement is substantially similar to the damaged object.

Next, in step 1206, the system may look-up the price for the replacement object. The price could be found by looking at the vendor's online storefront, for example. In step 1208, the system may provide an estimated replacement cost. The estimated replacement cost may be based on the price of a replacement object, shipping and/or other factors. Finally, in step 1210, the system may automatically place an order for the replacement object to be delivered to the customer. In some cases, the system pays a vendor directly for the replacement object during the ordering process, rather than reimbursing the customer. In some embodiments, the system may automatically notify the customer (via email, text message, etc.) that a replacement object has been ordered.

In other embodiments the estimated replacement cost could be based on the price the customer originally paid for the object, rather than the price of the replacement object. In some embodiments, the estimated replacement cost may be adjusted to account for depreciation of an item (for example, a car).

In addition to providing estimated repair/replacement costs to a customer (for example, in step 1110 of FIG. 11 and in step 1208 of FIG. 12), a system could also provide estimated times for repair and/or replacement. Specifically, the system could estimate the time for a repair based on historical information and/or by using a predictive model. Likewise, the system could estimate the time for replacement based on historical information, vendor provided estimates and/or by using predictive models. By automatically predicting repair/replacement times, the system may improve the customer's experience since he or she will have some sense of how long the repair/replacement will take.

In embodiments where vendors (for example, general contractors, builders, electronic manufacturers, etc.) are used for repairs, the system can build an internal ranking of vendors based on the quality of repairs, repair costs, repair times, etc. This information can be used to select the best vendors when choices are available. In addition, this information can be used to adjust predictions for cost, time, etc. for hiring a particular vendor to make repairs.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A method for determining damage to a group of non-vehicle physical objects located inside a home of a customer comprising the steps of:

prior to a loss causing incident, creating an inventory of a plurality of non-vehicle physical objects associated with a home of a customer, wherein the inventory is automatically generated from images of the physical objects and wherein the physical objects are non-vehicle personal items inside the home of the customer;

wherein creating the inventory includes capturing a first image using a remote device having a camera, the first image including a group of two or more of the plurality of non-vehicle physical objects, wherein the first image is taken prior to the loss causing incident, and wherein the group of non-vehicle physical objects are captured in their initial state and are spaced apart from each other, the group of non-vehicle physical objects including a wearable object and a personal electronic device;

wherein creating the inventory further comprises automatically identifying each of the non-vehicle physical objects in the group of non-vehicle physical objects in the first image using machine vision algorithms and gathering inventory data for each of the non-vehicle physical objects identified in the first image, wherein the inventory data includes at least a purchase price for the identified non-vehicle physical object, the purchase price being automatically retrieved from a purchase history of the customer;

after the loss causing incident, capturing a second image using a networked surveillance camera in the home of the customer, the networked surveillance camera being different from the remote device used to capture the first image, the second image including the group of two or more of the plurality of non-vehicle physical objects, wherein the second image is taken after the first image, and wherein the group of non-vehicle physical objects including the wearable object and the personal electronic device are captured in their modified state and are spaced apart from each other;

detecting differences between the group of non-vehicle physical objects in their initial state and the group of non-vehicle physical objects in their modified state using the machine vision algorithms to compare the initial and modified states of each non-vehicle physical object in the group of non-vehicle physical objects; and based on the detected differences, determining one of the wearable object and the personal electronic device needs to be repaired and the other needs to be replaced.

2. The method according to claim 1, wherein the method further includes determining a vendor for making repairs to the one of the wearable object and the personal electronic device.

3. The method according to claim 2, wherein the method further includes automatically contacting the vendor and requesting repairs.

4. The method according to claim 1, wherein the purchase history of the customer is accessed from at least one retailer or bank to obtain the purchase price of the identified non-vehicle physical object.

5. The method according to claim 1, wherein the method further includes creating a visualization of the group of non-vehicle physical objects to highlight damaged regions.

6. The method according to claim 5, wherein the method further includes providing a transformation tool as part of the visualization, wherein the transformation tool allows a user to transition between views of the group of non-vehicle physical objects in their initial and modified states.

7. A method for automatically replacing a non-vehicle physical object located inside a home of a customer after a loss causing incident comprising the steps of:

prior to a loss causing incident, creating an inventory of a plurality of non-vehicle physical objects associated with a home of a customer, wherein the inventory is automatically generated from images of the non-vehicle physical objects and wherein the non-vehicle physical objects are non-vehicle personal items inside the home of the customer;

wherein creating the inventory includes capturing a first image using a remote device having a camera, the first image including a first physical object of the plurality of non-vehicle physical objects and a second physical object of the plurality of non-vehicle physical objects, the first physical object being spaced apart from the second physical object, wherein the first image is taken prior to the loss causing incident, and wherein each of the first physical object and the second physical object is captured in its initial state;

wherein creating the inventory further comprises automatically identifying each of the non-vehicle physical objects in the first image using machine vision algorithms and gathering inventory data for each of the non-vehicle physical objects identified in the first image, wherein the inventory data includes at least a purchase price for the identified non-vehicle physical object, the purchase price being automatically retrieved from a purchase history of the customer;

after the loss causing incident, capturing a second image using a networked surveillance camera in the home of the customer, the networked surveillance camera being different from the remote device used to capture the first image, the second image including the first physical object and the second physical object, wherein the second image is taken after the first image, and wherein each of the first physical object and the second physical object is captured in its modified state;

detecting differences between each of the first physical object and the second physical object in its initial state and in its modified state using the machine vision algorithms to compare the initial and modified states of the first physical object and the second physical object;

determining that the first physical object needs to be replaced;

determining a replacement cost for the first physical object;

replacing the first physical object;

determining that the second physical object needs to be repaired;

determining a repair cost for the second physical object; and repairing the second physical object.

8. The method according to claim 7, wherein replacing the first physical object includes placing an order for a replacement physical object.

9. The method according to claim 8, wherein the method includes alerting a customer that a replacement physical object has been ordered.

10. The method according to claim 7, wherein the method includes predicting a cost of repairing the first physical object based on any detected differences between the initial state and the modified state; and wherein determining that the first physical object needs to be replaced includes comparing the cost of repairing the first physical object with the replacement cost.

11. The method according to claim 7, wherein the step of capturing the first image includes recording a video.

12. The method according to claim 7, wherein the method further includes automatically contacting a vendor and requesting repairs for the second physical object.

13. The method according to claim 7, wherein the method includes predicting a timeframe for replacing the first physical object.

14. A method of visualizing damage to a non-vehicle physical object inside a home of a customer comprising the steps of:

prior to a loss causing incident, creating an inventory of a plurality of non-vehicle physical objects associated with a home of a customer, wherein the inventory is automatically generated from images of the non-vehicle physical objects and wherein the non-vehicle physical objects are non-vehicle personal items inside the home of the customer;

wherein creating the inventory includes capturing a first image using a remote device having a camera, the first image including a first physical object of the plurality of non-vehicle physical objects and a second physical object of the plurality of non-vehicle physical objects, the first physical object being spaced apart from the second physical object, wherein the first image is taken prior to the loss causing incident, and wherein each of the first physical object and the second physical object is captured in its initial state;

wherein creating the inventory further comprises automatically identifying each of the non-vehicle physical objects in the first image using machine vision algorithms and gathering inventory data for each of the non-vehicle physical objects identified in the first image, wherein the inventory data includes at least a purchase price for the identified physical object, the purchase price being automatically retrieved from a purchase history of the customer;

after the loss causing incident, capturing a second image using a networked surveillance camera in the home of the customer, the networked surveillance camera being different from the remote device used to capture the first image, the second image including the first physical object and the second physical object, wherein the second image is taken after the first image, and wherein each of the first physical object and the second physical object is captured in its modified state;

detecting differences between each of the first physical object and the second physical object in its initial state and in its modified state;

based on the detected differences, determining one of the first physical object and the second physical object needs to be repaired and the other needs to be replaced;

displaying each of the first physical object and the second physical object in its modified state; and providing a transformation tool, wherein the transformation tool can be used to transform each of the displayed first physical object and second physical object from its modified state to its initial state.

15. The method according to claim 14, wherein the transformation tool is a sliding window that divides a display space for displaying each of the first physical object and the second physical object into a first display portion and a second display portion, the first display portion being configured to display a portion of the first physical object or the second physical object in its initial state and the second display portion being configured to display a portion of the first physical object or the second physical object in its modified state.

16. The method according to claim 15, wherein as a boundary of the sliding window is moved the first display portion and the second display portion change sizes.

17. The method according to claim 14, wherein capturing the second image includes capturing a live video feed of the first physical object and the second physical object; and wherein the method further includes superimposing repairs onto regions of the first physical object or the second physical object associated with damage.

18. The method according to claim 14, wherein the step of detecting differences includes using the machine vision algorithms to compare the initial and modified states of each of the first physical object and the second physical object.

19. The method according to claim 14, wherein the visualization displays a first damaged region using a first display pattern; and wherein the visualization displays a second damaged region using a second display pattern that is different from the first display pattern.

20. The method according to claim 14, wherein the first physical object is a wearable object and wherein the second physical object is a personal electronic device.

* * * * *